May 18, 1926.
G. M. HICK ET AL
1,585,348
METHOD AND MEANS FOR MOLDING AND HARDENING PHENOL ALDEHYDE
CONDENSATION PRODUCTS
Filed Nov. 7, 1925
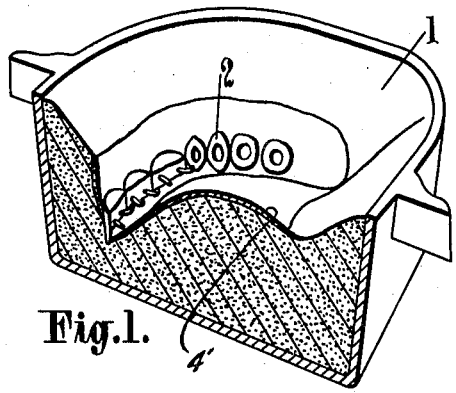
Fig.1.
Fig.2.
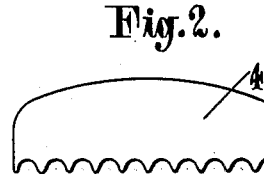
Fig.3.
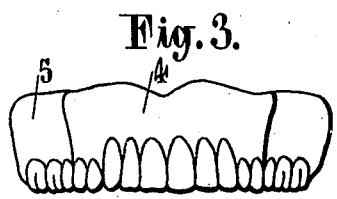
Fig.4.
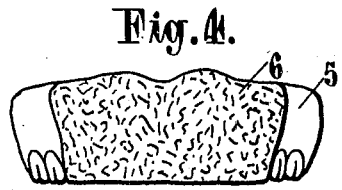
Fig.5.
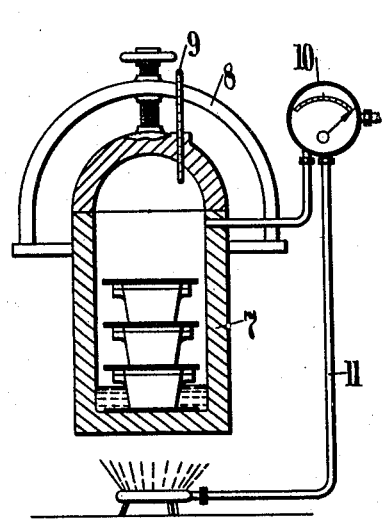
INVENTORS
G. M. HICK,
N. G. HICK
BY
ATTORNEY Patented May 18, 1926.

1,585,348

UNITED STATES PATENT OFFICE.

GODFREY MACDONA HICK AND NAOMI GERTRUDE HICK, OF BRENTWOOD, ENGLAND.

METHOD AND MEANS FOR MOLDING AND HARDENING PHENOL-ALDEHYDE CONDENSATION PRODUCTS.

Application filed November 7, 1925. Serial No. 67,657.

This invention has for its object an improved method of and means for molding plastic composition, of which the predominating material is a phenol-aldehyde condensation product. Such compositions are already known and one form has come into considerable commercial use.

The present invention primarily comprises a method whereby phenolic condensation product can be satisfactorily molded in a porous mold, for example of plaster of Paris. It is more particularly intended for the manufacture of artificial dentures with the existing means usually employed by dentists in manufacturing such articles from vulcanite, but it is not limited thereto as it can be equally applied to the construction of artificial limbs or parts of the body or other objects, from which casts are usually taken.

We are aware that it is not broadly new to mold compositions of the kind now concerned, but so far as we are aware it has hitherto been necessary to use molds of steel or like impervious material which are not readily susceptible of being formed from preliminary casts.

The invention will be described in connection with the manufacture of artificial dentures. For this purpose an impression is taken in the ordinary way and a denture with porcelain teeth is thereafter set up and molded, the said denture being, however, characterized in that the teeth are formed of porcelain or like solid material, but the plate is formed of wax or other easily melted material. The wax denture is then surrounded by plaster of Paris in a suitable receptacle, the plaster being arranged in two or more parts which are separated. The wax is thereupon scalded out leaving the porcelain teeth in situ in one of the parts. The said part of the mold is then painted thoroughly with oil such as linseed or olive oil which oil may contain a suitable pigment or dye, and the mold is now heated and carefully filled with the material of suitable colour in a plastic state, the complementary parts of the mold similarly painted being then set up in position and clamped together. The assembled mold is then heated in a boiler or other suitable apparatus to the temperature required to harden the material, usually between 250 and 300 degrees Fahrenheit, after which the molded article is removed and filed and sandpapered and polished as desired. We find that by coating the plaster with oil as aforesaid, the material is prevented from running, and that whereas without this operation the material would be liable to run into the pores of the plaster and might even unite with the plaster in such a way that the two were afterwards incapable of separation, with the above method the product remains separate and truly retains the shape of the molded article. Further, the pigment carried by the oil is caused to enter the material and modify its colour, in the present case, to accord with that of the gums.

The invention further comprises a modification of the above process intended more particularly for providing false gums of improved appearance in ordinary vulcanite dentures. For this purpose a thin strip of material is taken, the lower edge being festooned to agree with the space between the teeth. The denture is heated and the said strip is then applied to its front face and molded as desired. The exposed face of the material is then covered with a putty formed of whitening and oil of the kind referred to in the previous process, and the whole is then invested in plaster of Paris and heated in a boiler or other suitable heating means to harden the material. By this means we provide a facing or artificial gums which has a more natural appearance than vulcanite and greatly improves the appearance of the denture, the success of the method again depending on the use of an oil layer to separate the material from the plaster of Paris during the heating process.

In both cases the heating process can be carried out in an ordinary dental closed boiler which is usually fitted with a pressure gauge and worked at a pressure greater than atmospheric and capable of increase up to about 100 lb. per square inch.

We should here observe that in the heating process it is necessary to prevent the material from bubbling which it is liable to do at the temperatures necessary for speedy hardening. This is effected by increasing the pressure in which the material is heated and so raising the temperature of its boiling point. We find that by using as a heating medium the vapor of alcohol or methylated spirits boiled in an ordinary closed dental boiler at a pressure of about 40 lb. per square inch, a satisfactory hardening of the material can be effected without any liability to the difficulty referred to. It is to be noted, however, that especially with the formation of devices other than dentures the material may be hardened by any other suitable means at any other suitable temperature and pressure, since the material can in fact if the temperature is kept low be hardened at atmospheric pressure, although this for the purposes described above is open to the objection that its takes a much longer time to effect.

The invention is illustrated in the accompanying drawings in which:

Fig. 1 represents a sectional view of part of a mold for forming a denture.

Figure 2 represents a facing strip for use on a formed denture.

Fig. 3 represents a denture with said facing strip applied thereto,

Fig. 4 represents the assembled parts of Fig. 3 with a layer of putty over the strip, and Fig. 5 represents a view of the arrangement for heating the molds.

Referring now to the drawing, Fig. 1 illustrates a cross section of half a mold 1 from which the wax denture has been boiled out leaving the teeth 2 in situ. According to the invention the plaster of Paris surface 3 of the mold is painted with oil which may contain a pigment preparatory to the molding and heating therein of a complete denture of material. The oil layer is indicated at 4' but the thickness thereof is exaggerated in the drawing for the sake of clearness.

Turning now to Figs. 2 to 4, the festooned strip 4 is applied to an existing vulcanite denture 5, Fig. 3 for example in the manner illustrated being shaped and molded as desired according to the exposed faces of the teeth. The strip and denture are then covered with putty 6, Fig. 4, and inserted in a half mold casing and plaster of Paris poured round the outside to agree with the new shape. The upper half mold is then formed if necessary (the upper half mold by which the denture was made will be suitable if available) and the mold is closed and heated as described.

Fig. 5 illustrates the heating means which comprise an ordinary dental boiler 7, of which the top is held down by a cover 8, provided with a thermometer 9 and pressure gauge 10 adapted to control the amount of heat applied through the gas pipe 11. The molds 12 are placed in the boiler on asbestos sheets one above the other and methylated spirits added to about the level indicated. Heating is effected at a pressure of about 40 lb. per sq. inch and 300° Fahrenheit as described.

Obviously, the invention is not limited to the production of a facing of artifical gums, but may be used for facing the vulcanite palate or any other object with material if desired.

From the above description, it will be apparent that human features, artificial limbs and the like can also be formed of or faced with phenolic condensation product by using plaster of Paris molds coated with oil and effecting the hardening with the vapour of a volatile liquid approximating to the conditions of temperature and pressure indicated.

Instead of the mixture of oil and whitening, any other suitable oil-containing medium of sufficient consistency to cover the material when the plaster is being applied may be used.

We claim:—

1. A method of molding a phenol-aldehyde condensation product consisting in first making a mold of porous material, coating it with oil, and molding and hardening the product in the oiled mold.

2. A method of molding a phenol-aldehyde condensation product for dentures, artificial limbs or the like consisting in first taking a cast, forming a mold therefrom in plaster of Paris or like material, coating said mold with oil, and molding and hardening said product in said oiled mold.

3. A method of facing vulcanite or the like with a phenol-aldehyde condensation product consisting in molding the product in strip or other form on the vulcanite, coating the exposed face with a medium containing oil investing in plaster of Paris and hardening under heat.

4. A method of forming artificial dentures of a phenol-aldehyde condensation product consisting in first forming a denture of which the teeth are formed of solid material and the plate is formed of easily melted material forming a mold therefrom, melting out the plate, coating the mold with oil, and molding and hardening the product in the oiled mold.

5. A method as claimed in claim 4 in which the plate is first formed of wax.

6. A method of molding a phenol-aldehyde condensation product consisting in first making a mold of porous material, coating it with oil, and molding and hardening the product in the oiled mold by subjecting to the vapour of alcohol or methylated spirits boiled in a closed boiler under pressure greater than atmospheric.

7. Means for facing the gums of dentures with a phenol-aldehyde condensation product consisting in a thin strip of the product of which one edge is festooned to agree with the interdental spaces.

8. A method of molding a phenol-aldehyde condensation product consisting in first making a mold of porous material, coating it with oil, and molding and hardening the product in the oiled mold under pressure greater than atmospheric.

9. A method of molding a phenol-aldehyde condensation product for dentures, artificial limbs or the like consisting in first taking a cast, forming a mold therefrom in plaster of Paris or like material, coating said mold with oil, and molding and hardening said product in said oiled mold under pressure greater than atmospheric.

10. A method of facing vulcanite or the like with a phenol-aldehyde condensation product consisting in molding the product in strip or other form on the vulcanite, coating the exposed face with a medium containing oil investing in plaster of Paris and hardening under heat under pressure greater than atmospheric.

In testimony whereof we affix our signatures.

GODREY MACDONA HICK.
NAOMI GERTRUDE HICK.